H. N. R. HEIN.
WAGON BODY SCALE.
APPLICATION FILED NOV. 19, 1915.
1,186,396.
Patented June 6, 1916.
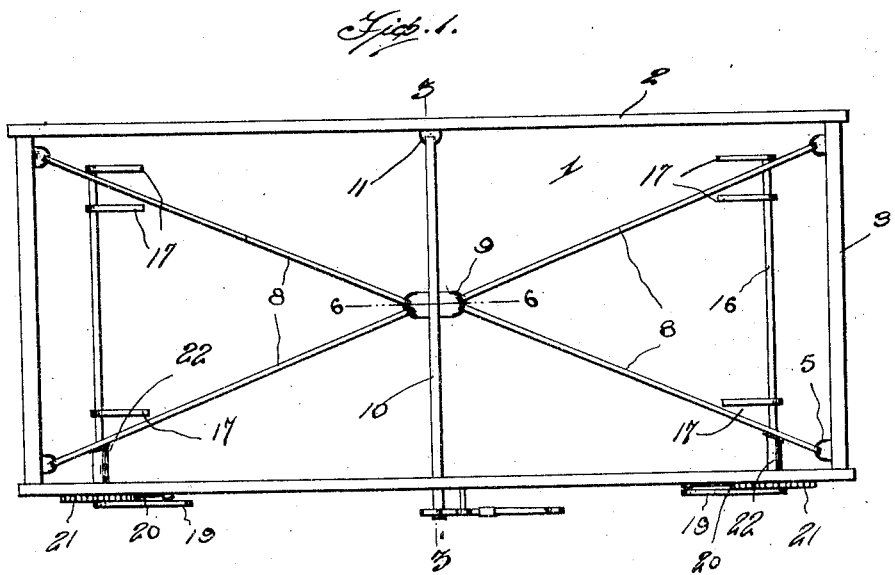
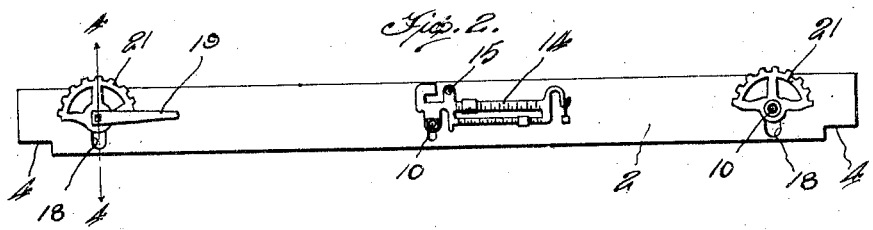
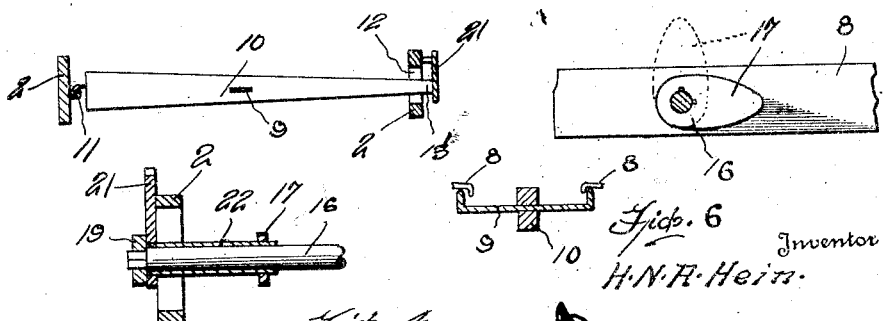
Inventor
H. N. R. Hein.

UNITED STATES PATENT OFFICE.

HUGO N. R. HEIN, OF ECHO, MINNESOTA.

WAGON-BODY SCALE.

1,186,396.  Specification of Letters Patent.  Patented June 6, 1916.

Application filed November 19, 1915. Serial No. 62,356.

*To all whom it may concern:*

Be it known that I, HUGO N. R. HEIN, a citizen of the United States, residing at Echo, in the county of Yellow Medicine and State of Minnesota, have invented certain new and useful Improvements in Wagon-Body Scales; and I do hereby declare the following to be a full, clear, and exact description of the invention, such as will enable others skilled in the art to which it appertains to make and use the same.

The invention relates to improvements in wagon body scales.

The object of the present invention is to improve the construction of wagon body scales and to provide a simple, practical, and efficient scale of this character adapted to be readily applied to the running gear of a wagon and capable of receiving a box or other form of body and equipped with weighing mechanism adapted to be readily thrown into and out of operation so that the weighing mechanism will not be subjected to the weight of the wagon box and the load except during weighing operation.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing Figure 1 is a plan view of a wagon body scale constructed in accordance with this invention, Fig. 2 is a side elevation of the same, Fig. 3 is a transverse sectional view, Fig. 4 is a detail sectional view, Fig. 5 is a detail sectional view illustrating the arrangement of the cam. Fig. 6 is a detail sectional view on the line 6—6 of Fig. 1.

Like numerals of reference designate corresponding parts in the several figures of the drawing.

In the accompanying drawing in which is illustrated the preferred embodiment of the invention, the wagon body scale comprises in its construction an oblong frame 1 composed of side bars 2, and transverse connecting bars 3, the side bars being provided at their terminals with lower notches 4 adapted to receive the bolsters of a running gear so that the frame will fit between the stakes thereof. The rectangular frame is provided at its end bars with inwardly extending loops 5 adapted to receive the outer terminals of diagonally arranged levers 8 arranged similar to the platform levers of an ordinary scale and connected at their adjacent ends 9 with a centrally arranged transverse lever 10 fulcrumed at one end on a loop 11 having a suitable knife edge similar to the loops at the ends of the frame and the other end of the centrally arranged transverse lever extends through a slot 12 in the opposite side of the frame of the scale. The end 13 which projects outwardly through the slot is connected with a weighing beam 14 mounted on the frame at the exterior thereof and fulcrumed at 15. In practice a suitable housing will be provided for the weighing beam which is equipped with the usual weight and graduations but as the particular construction of the weighing beam does not constitute a portion of the present invention and as any form of weighing beam may be employed further description of the same is deemed unnecessary. The platform or diagonally arranged levers 8 carry transverse shafts 16 journaled in suitable bearings of the said levers and located at the end portions of the weighing mechanism and provided with cams 17 arranged in pairs at the terminal portions of the said transverse shafts and adapted to be rotated and engaged with a wagon body, not shown whereby the wagon body will be supported upon the weighing mechanism. The shafts 16 are extended at one end through slots 18 of the adjacent side of the frame of the scale and the extended ends of the shaft are equipped with levers 19 having dogs or detents 20 adapted to engage teeth of segments 21. The toothed segments are mounted on sleeves 22 suitably fixed to the adjacent diagonal levers and extending through the slots 21ᵃ of the adjacent side of the frame. The sleeves are relatively fixed and secure the shafts in their rotary adjustment and they are adapted to operate in the slots 21ᵃ of the side of the frame. The levers are adapted to be swung upwardly and downwardly to raise and lower the wagon body or box and in weighing operations, the wheels of the running gear, not shown, may be removed to arrange the running gear on the ground.

It will be seen that the scale is exceedingly simple and inexpensive in construction and that it is in convenient position for ready use at all times.

What is claimed is:—

1. A scale of the class described including a frame adapted to be placed on the running gear of a vehicle, weighing mechanism mounted on the frame and including longitudinally disposed levers located within the frame, transverse shafts mounted on the levers and provided with means adapted to be projected above the frame to support a wagon body or the like upon the weighing mechanism and means for rotating the shaft to lift a wagon body from the frame and replace it thereon.

2. A scale of the class described including a frame adapted to be placed on the running gear of a vehicle, weighing mechanism mounted on the frame and including longitudinally disposed levers located within the frame, transverse shafts mounted on the longitudinally disposed levers and provided with spaced cams arranged to project above the upper edges of the frame and adapted to support a wagon body clear of the same and upon the weighing mechanism and means for rotating the shafts.

3. A scale of the class described including a frame adapted to be placed on the running gear of a vehicle, weighing mechanism mounted on the frame and including longitudinally disposed levers located within the frame, transverse shafts mounted on the longitudinally disposed levers and provided with means adapted to be projected above the upper edges of the frame to support a wagon body on the weighing mechanism and lower the same upon the frame, said shafts being extended at one end through the adjacent side of the frame and provided with operating levers, relatively fixed toothed segments located adjacent to the levers and pawls or dogs carried by the levers for engaging the toothed segments to secure the shafts in their rotary adjustment.

4. A scale of the class described including a substantially oblong frame adapted to be arranged upon a running gear and composed of spaced sides and ends, diagonally arranged levers fulcrumed at the ends of the frame, a centrally arranged transversely disposed lever fulcrumed at one side of the frame and connected at a point intermediate of its ends with the said diagonally arranged levers and extended through the opposite side of the frame, a weighing beam connected with the transverse lever, transverse shafts mounted on the diagonal levers, and provided with cams arranged to project above the upper edges of the frame to support a wagon body or bed above the same and on the weighing mechanism and means for securing the shafts in their rotary adjustment.

In testimony whereof I affix my signature in presence of two witnesses.

HUGO N. R. HEIN.

Witnesses:
F. W. SOMMERFELD,
H. H. SOMMERFELD.